US009600028B2

United States Patent
Gathings

(10) Patent No.: US 9,600,028 B2
(45) Date of Patent: Mar. 21, 2017

(54) ENCLOSURES FOR PROTECTING DEVICES AND METHODS OF MANUFACTURING ENCLOSURES FOR PROTECTING DEVICES

(71) Applicant: AMERICAN RELIANCE, INC., El Monte, CA (US)

(72) Inventor: James D. Gathings, Huntington Beach, CA (US)

(73) Assignee: MILDEF, INC., Alexandria, VA (US)

( * ) Notice: Subject to any disclaimer, the term of this patent is extended or adjusted under 35 U.S.C. 154(b) by 125 days.

(21) Appl. No.: 14/454,421

(22) Filed: Aug. 7, 2014

(65) Prior Publication Data

US 2015/0049425 A1 Feb. 19, 2015

Related U.S. Application Data

(60) Provisional application No. 61/867,423, filed on Aug. 19, 2013.

(51) Int. Cl.
*G06F 1/16* (2006.01)
*G06F 1/18* (2006.01)

(52) U.S. Cl.
CPC .......... *G06F 1/1628* (2013.01); *G06F 1/1637* (2013.01); *G06F 1/182* (2013.01); *G06F 1/1656* (2013.01); *Y10T 29/49826* (2015.01)

(58) Field of Classification Search
CPC .... G06F 1/1628; G06F 1/1626; G06F 1/1656; G06F 1/1637
USPC .............. 361/679.01–679.45, 679.55–679.59
See application file for complete search history.

(56) References Cited

U.S. PATENT DOCUMENTS

| | | | |
|---|---|---|---|
| 5,550,712 A | 8/1996 | Crockett | |
| 6,670,950 B1 * | 12/2003 | Chin | G06F 1/162 345/1.1 |
| 7,221,559 B1 * | 5/2007 | Duarte | G06F 1/1624 361/679.02 |
| 7,251,131 B2 | 7/2007 | Shah | |
| 8,071,878 B2 | 12/2011 | Mangaroo | |
| 8,144,456 B1 * | 3/2012 | Kunert | G06F 1/1626 345/642 |
| 8,531,834 B2 | 9/2013 | Rayner | |
| 8,619,417 B1 | 12/2013 | Helton | |
| 8,695,798 B2 | 4/2014 | Simmer | |
| 8,708,142 B2 | 4/2014 | Rayner | |
| 2005/0013104 A1 * | 1/2005 | Feague | G06F 1/1626 361/679.3 |
| 2005/0174731 A1 * | 8/2005 | Lin | G06F 1/203 361/679.49 |

(Continued)

OTHER PUBLICATIONS

Blickenstorfer, Xplore's 6th generation of the ultra-rugged iX104 tablet brings state-of-the-art technology and blistering performance into the field, Apr. 2014, 17 pages. Retrieved on May 1, 2014 from: http://www.ruggedpereview.com/3_slates_xplore_ix104xc6_full.html.

*Primary Examiner* — Nidhi Thaker

(57) ABSTRACT

An enclosure for a computing device adapted to resist ingress of environmental elements comprises a frame, a first cover attached and sealed to the frame, and a second cover attached and sealed to the frame. The frame provides a sidewall structure including a first pair of channels having a first length and a second pair of channels having a second length. Each channel is separately fabricated and the frame is formed by corners of the first pair of channels to corners of the second pair of channels.

15 Claims, 14 Drawing Sheets

(56) References Cited

U.S. PATENT DOCUMENTS

| | | | |
|---|---|---|---|
| 2007/0076361 A1* | 4/2007 | Yin | G06F 1/1616 361/679.4 |
| 2010/0110625 A1* | 5/2010 | Chen | G06F 1/1616 361/679.02 |
| 2013/0098782 A1* | 4/2013 | Diebel | A45C 11/00 206/45.25 |
| 2013/0220841 A1 | 8/2013 | Yang | |
| 2013/0235521 A1 | 9/2013 | Burch | |
| 2014/0262847 A1* | 9/2014 | Yang | A45C 11/00 206/37 |
| 2014/0274215 A1* | 9/2014 | Del Toro | G06F 1/1628 455/566 |

* cited by examiner

ENCLOSURES FOR PROTECTING DEVICES AND METHODS OF MANUFACTURING ENCLOSURES FOR PROTECTING DEVICES

CLAIM OF PRIORITY

This application claims the benefit of U.S. Provisional Application No. 61/867,423, filed Aug. 19, 2013, the contents of which is incorporated herein by reference.

FIELD OF THE INVENTION

Embodiments of the present invention are generally related to enclosures for protecting devices and methods for manufacturing such enclosures.

BACKGROUND

Enclosures for protecting devices are typically selected based on certification that an enclosure meets certain standards for protection of its contents. For a fully rugged enclosure housing sensitive electronic equipment, such as a laptop computer for example, the United States defense industry requires military standard 810G certification for extreme temperature, shock, vibration, water, humidity, salt fog, and other environmental specifications, as well as ingress protection (IP) rating certification for dust and water resistance.

Enclosures are typically machined or molded to target a specific application. Such manufacturing methods can be very costly. For example, magnesium is a material appreciated for a relative high strength-to-weight ratio; however, magnesium is not easily machined due to its proclivity to burn, necessitating use of a mold. Molds for forming enclosures using liquid magnesium can easily cost in the millions of dollars. With limited product runs and ever changing sizes of components and applications, per-unit costs for such enclosures are high relative to consumer-grade enclosures that use more modest materials with less demanding performance specifications.

The relatively high per-unit cost associated with fully and semi-rugged enclosures typically limit the customer base for such enclosures to industries where the need for certification outweighs concerns about cost. However, a need exists among sectors of the consumer market for rugged, standard certified enclosures that are more competitive in price with consumer-grade enclosures than existing available fully and semi-rugged enclosures. For example, academics performing field work and adventure hobbyists represent just two of many groups that can benefit from less expensive, yet fully and semi-rugged enclosures for sensitive devices, such as laptops, cameras, and test equipment.

DETAILED DESCRIPTION

Figure 1:
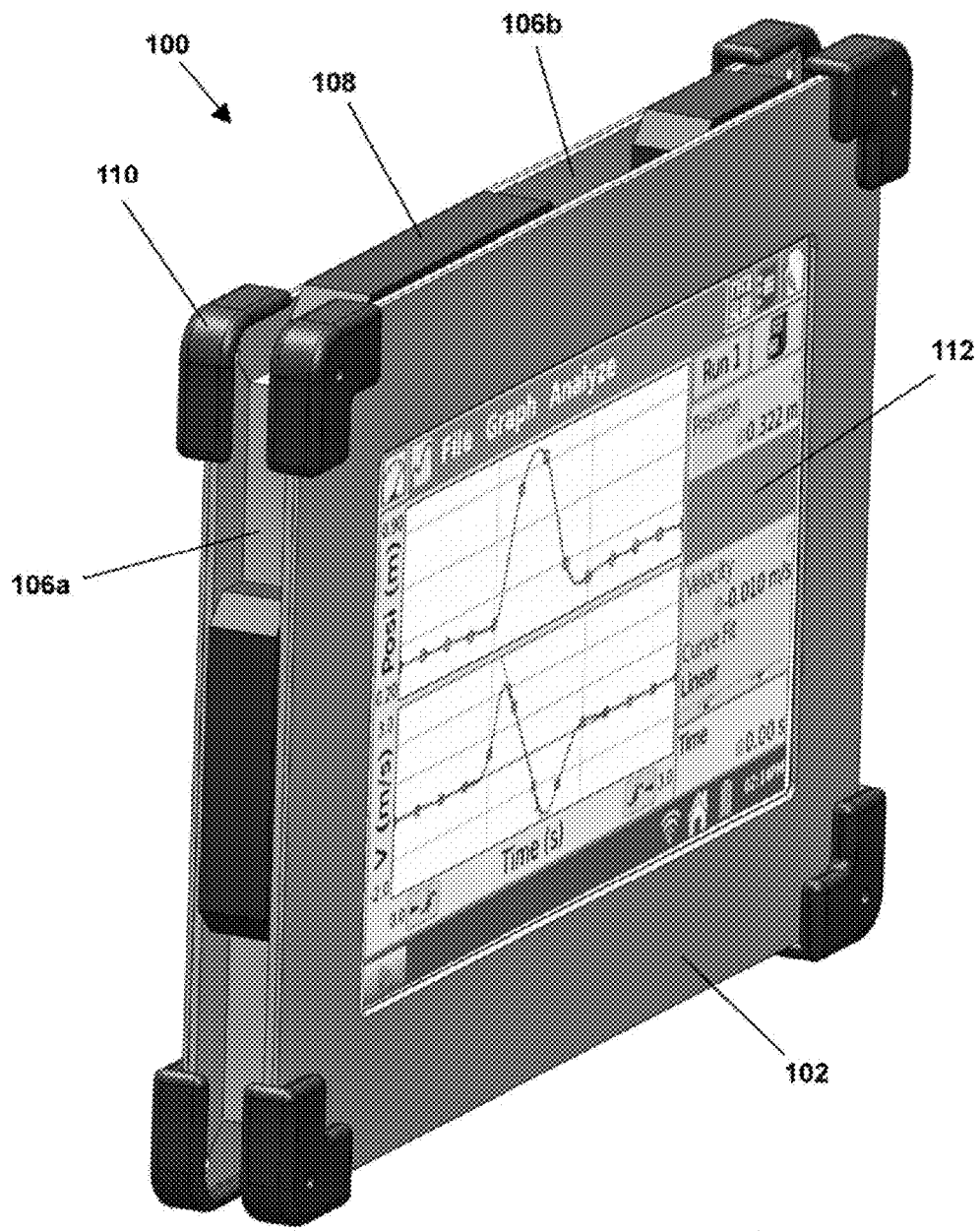
FIG. 1 is a front perspective view of an embodiment of an enclosure for housing and protecting a computer device in accordance with the present invention.

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. In addition, the first digit of a reference number identifies the drawing in which the reference number first appears.

It would be apparent to one of skill in the art that the present invention, as described below, may be implemented in many different embodiments of hardware illustrated in the figures. Any hardware described herein is not limiting of the present invention. Thus, the operation and behavior of the present invention will be described with the understanding that modifications and variations of the embodiments are possible, given the level of detail presented herein.

FIG. 1 is a front perspective view of an embodiment of an enclosure for housing and protecting a computer device in accordance with the present invention. Enclosures in accordance with the present invention can be used to house multiple different devices sensitive to environmental conditions when used in the field, for example. Such devices can include, but are not limited to, measurement instruments, computer devices, communication equipment, display equipment, audio and video recording equipment, and other devices that can benefit from protection from environmental conditions.

As shown, the device housed by the enclosure 100 is a computer device with a display screen 112. The display screen 112 can be a touch sensitive screen so that the computer device can act as a tablet computer controlled by contact with the screen, or alternatively the computer device can be wirelessly controlled by an external device such as a smart phone or a wireless keyboard operating over any wireless standard. In many embodiments, no external connections are required for control. However, in alternative embodiments, control can be achieved via connection to the computer device through an input that can be satisfactorily sealed from internal components housed within the enclosure 100. For example, a universal serial bus (USB) port can allow wired connection of a keyboard and/or mouse.

The display screen 112 is bonded to a front cover 102 so that a seal is formed around the periphery of a hole in the front cover 102. For example, a touch sensitive display screen 112 can include a laminar assembly comprising a cover glass, a touch screen (e.g., a p-cap sensor), and a display (e.g., a liquid crystal display (LCD) optically bonded. The laminar assembly can then form a seal with the front cover 102 via an additional bonding step. The additional step can include, for example, affixing the laminar assembly to the front cover 102 with very high bond (VHB) tape. However, any technique for providing a seal that meets target standards for environmental isolation can be used.

A frame acting as a sidewall extending along the periphery of the enclosure 100 forms channels 106a, 106b within which can be mounted one or more modules 108. A module 108 can allow, in some embodiments, for communication between a computer device within the enclosure and devices and objects in the external environment. For example, a module 108 can house an antenna. An antenna is extended outside of the enclosure to effectively transmit and receive signals. The module 108 can be made from material that permits the transmission and receipt of signals preferably without unacceptable attenuation of the signals. For example, the module 108 can be made from a thermoplastic such as polyoxymethylene, which is commonly marketed under the trademark DELRIN®. Wires connecting the antenna (or other component) to a printed circuit board (PCB) such as a motherboard within the enclosure can be passed through a hole or holes drilled through the frame. The module 108 seals from the environment the component housed within the module 108 and the hole over which it is fitted. The channels 106a, 106b can be made deep enough to allow the module(s) 108 to be seated within the channels 106a, 106b such that the module(s) 108 do not extend outside of the channels 106a, 106b to thereby reduce opportunities for the module(s) 108 to be impacted by a shearing force from objects within the environment, for example. A module 108 can house myriad different components usable with a computer device including, but not limited to, cameras, sensors, bar code readers, radio frequency (RF) identification (ID) readers, etc. Further, a component need not be required to operate wirelessly through the module(s) 108, but can have an interface accessible externally, such as, for example, a card swipe, the previously mentioned USB connector, or legacy connectors such as RS232 connectors. Further, additional PCBs that do not necessarily interact with devices and objects in the external environment but that function with the motherboard or other PCBs within the enclosure can be housed in modules.

An additional benefit of a frame that forms channels 106a, 106b is that screw (or bolt) through-holes (i.e., attachment points) located along the edges of the frame and the front cover 102 and a rear cover allow the use of screws or bolts outside of the interior of the enclosure 100. One common source of failure in rugged enclosures is the loosening of screws within the enclosures that then make contact with the motherboard or other PCB to cause electrical shorts, for example. Locating the attachment points outside of the enclosure 100 can avoid such failures. The frame also provides opportunities for installing attachment points, for example for mounting to a vehicle or other locations. As will be appreciated, the channel created by the frame can mate with a mount having a complementary structure designed to seat within the channel. Such an arrangement can provide for quick attach and release type mounting, for example by sliding the enclosure onto the mount so that the complementary structure slides along the channel and snaps the enclosure into place at the appropriate location along the channel.

The enclosure 100 further includes bumpers 110 for absorbing impacts at the corner of the enclosure. In the embodiment shown, the bumpers 110 are standardized to allow them to be interchangeably used at any of the corners of the enclosure 100, thereby reducing the need to track multiple different bumper types in inventory that perform similar functions. The bumpers can be fabricated from, for example, rubber, or some other polymer or other material suitable for elastically absorbing shocks and vibrations to thereby dampen and/or prevent the forces of shocks and vibrations from transferring to the enclosure 100 and any sensitive equipment within the enclosure 100. As shown, the bumpers can be fitted over corners and affixed via holes that are used to fixedly connect components of the enclosure 100, as described further below. Additionally or alternatively, the bumpers can be affixed to the enclosure by adhesives, interference fitting, and/or any other technique suitable for bonding materials.

Figure 2A:
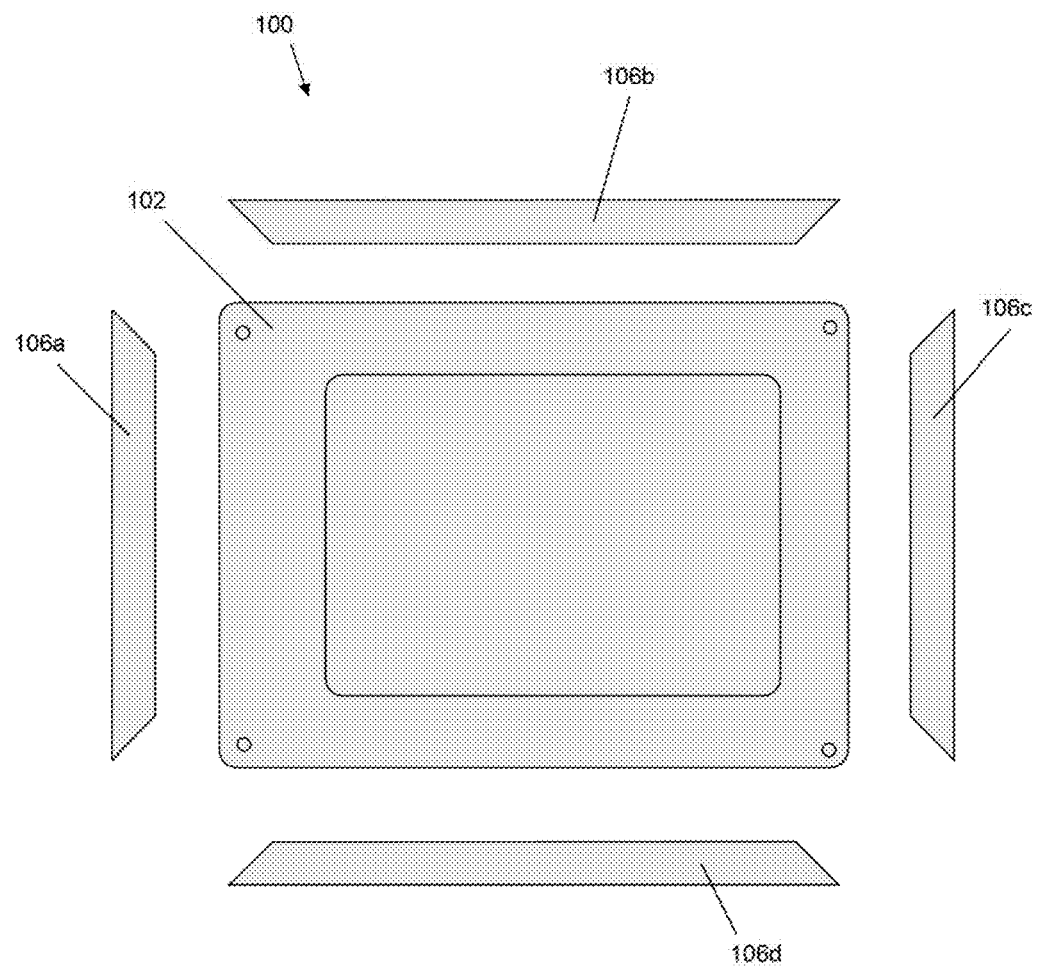
FIG. 2A is a front exploded view of a portion of the enclosure of FIG. 1 illustrating components of the enclosure prior to assembly.
Figure 2B:
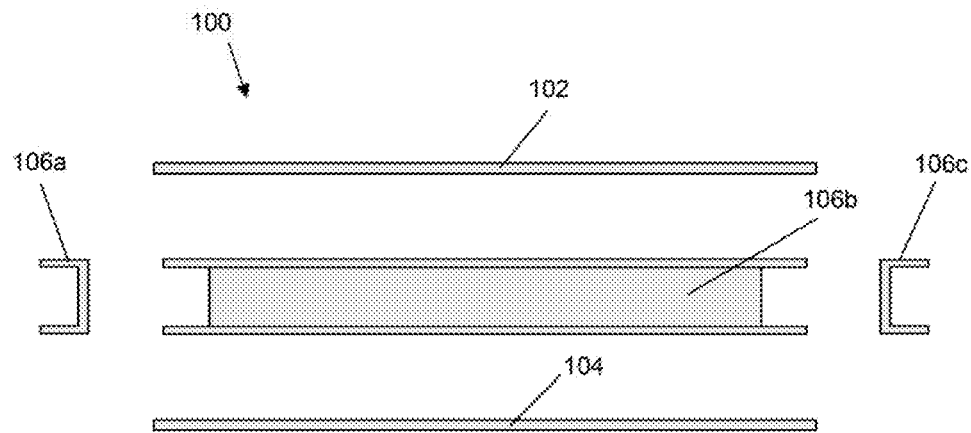
FIG. 2B is a bottom exploded view of the components illustrated in FIG. 2A.

Referring to FIGS. 2A and 2B, a portion of the enclosure 100 is shown in exploded view to allow illustration of the benefits to manufacturing from embodiments in accordance with the present invention. As shown, the frame that acts as a sidewall comprises two sets of two channels, one set of channels 106a for the length of the enclosure and one set of channels 106a for the width of the disclosure. Each channel 106a, 106b can be formed using myriad different manufacturing techniques, but the bracket shaped geometry of each channel 106a, 106b enables manufacturing by way of extrusion, which can be relatively inexpensive when compared with other techniques such as molding and machining. As shown, each channel 106a, 106b can be fabricated by extruding aluminum. In other embodiments, a material other than aluminum can be used for components of the enclosure, including thermoplastics, and other metals and composites. The channels 106a, 106b can be cut from much larger strips, allowing adjustment of the dimensions of the channels 106a, 106b on the fly. In the case of a computer device, thickness can vary from with the specifications of the computer device and often determined by a battery powering the computer device. The relatively inexpensive cost and simplicity of extrusion further enables an adjustment in height (or thickness) of the channel 106a, 106b to accommodate devices as appropriate.

While embodiments are described herein taking advantage of the relative value of manufacturing by extrusion, in still other embodiments, some other manufacturing technique can be used to form the enclosure, including, for example, machining from billets, cold rolling, three dimensional (3D) printing, which can potentially allow additional customization without additional costs, allowing the same components to be individually printed, or allowing for the combination of components. For example, a front cover could be printed along with the channels to integrally form the otherwise separate five components (the four ends and the cover). Printing is commercially performed for structures comprising plastic materials, and has also been proposed and demonstrated for structures comprising metal structures, and embodiments of enclosures in accordance with the present invention can be fabricated using any materials capable of being used to print the structures described herein and shown in the figures. Machining from billet can be useful for prototype/short runs where extrusion method is not economical.

Figure 3:
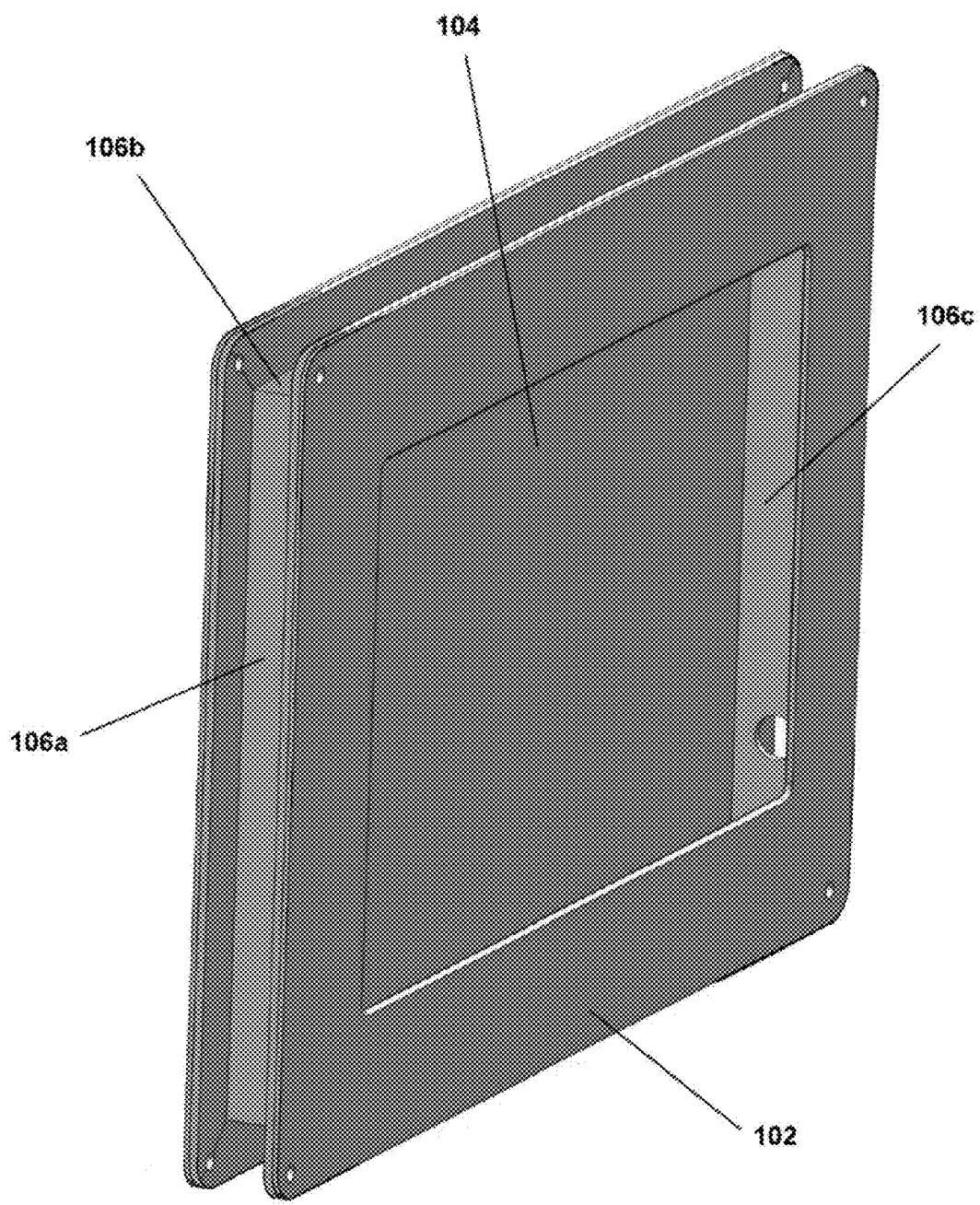
FIG. 3 is a front perspective view of the components illustrated in FIG. 2A connected together to form the enclosure.

As shown, the channels 106a, 106b are cut at 45 degree angles so that they form a flush interface at which the channels 106a, 106b are bonded to form a frame sealed from the environment at the corners. Note that the angles of the cuts can vary and need not be 45 degrees, but preferably any two channels 106a, 106b have corners that meet at a flush interface and form a substantially squared footprint. The channels 106a, 106b can be bonded by any suitable bonding technique, including welding and adhesion. For example, the channels 106a, 106b can be bonded by gas tungsten arc welding. Referring to FIG. 3, once the frame is formed, the front cover 102 and the rear cover 104 can be bonded to the frame and fixed by screws attached along the flanges formed by the channels 106a, 106b. Optionally, the rear panel 104 can be removable to enable access to devices within the enclosure 100, such as circuit boards and the like. In other embodiments, one or both of the front cover and the rear cover can be attached to the channels 106a, 106b to align the channels 106a, 106b, the corners of which are subsequently bonded to forma seal.

Figure 2C:
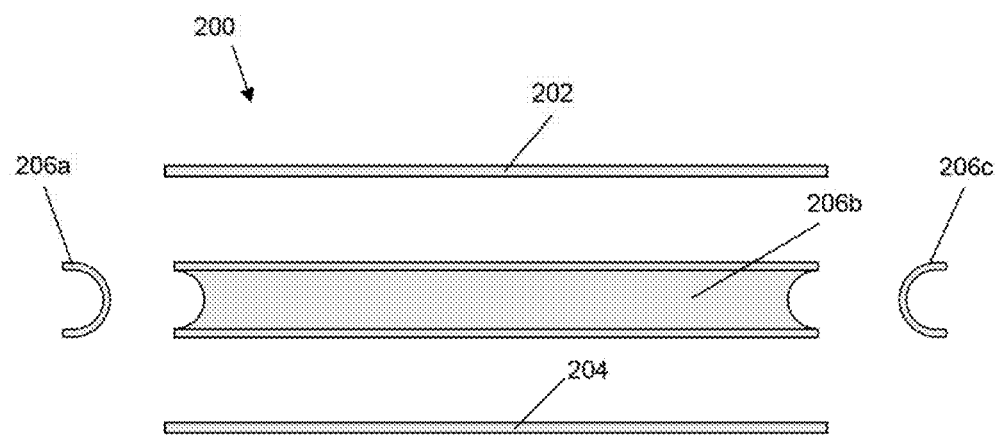
FIG. 2C is a bottom exploded view of components of an alternative embodiment of an enclosure for housing and protecting a computer device in accordance with the present invention.

Referring to FIG. 2C, the channels 206a, 206b need not be bracket shaped as shown in FIG. 2B. As shown in FIG. 2C, the channels 206a, 206b form a curved trough resembling a parentheses rather than a bracket. This geometry reduces stress points that can form at the corners of the bracket shaped channels 106a, 106b, distributing stress along the curve of the channel 206a, 206b. In other embodiments, the channels can have some other shape. For example, a "J" or "H" shaped channel can increase surface area for purposes of bonding the front and/or rear cover to the channel. Embodiments of the present invention are not intended to be limited to the geometries shown in FIGS. 2A and 2B.

Figure 4:
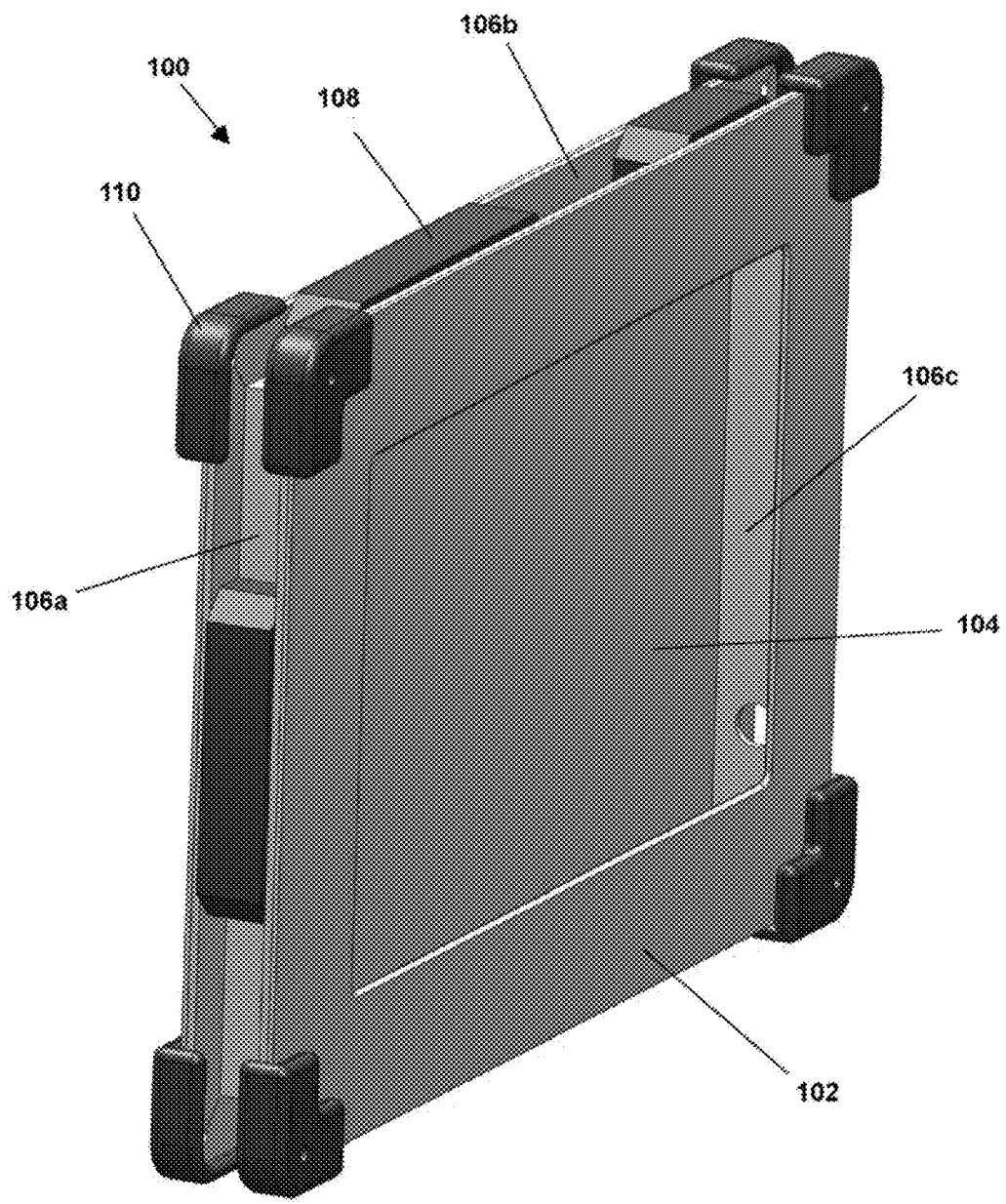
FIG. 4 is a front perspective view of the enclosure of FIG. 3 including bumpers mated with corners of the enclosure and a plurality of modules seated within a channel formed along a periphery of the enclosure.
Figure 5:
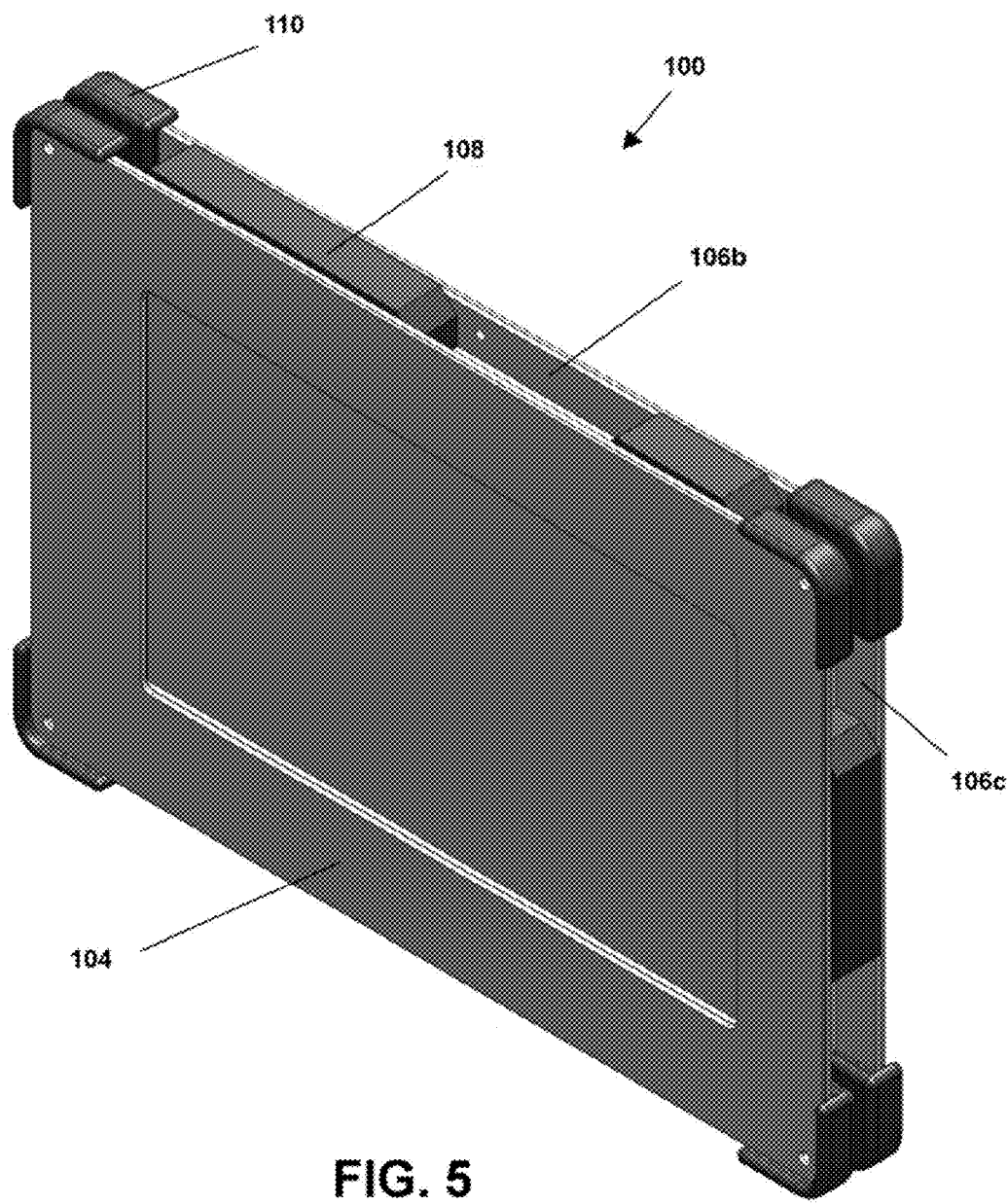
FIG. 5 is a rear perspective view of the enclosure of FIG. 4.

As shown in FIG. 3, the enclosure 100 is shown empty, however, in most cases, the display screen will be bonded to the front cover 102 before the front cover 102 is attached to the frame so that the attachment with the frame can be made permanent. The empty enclosure shows an additional through-hole that allows connection of a power connector. That through-hole is sealed off with an o-ring. A rugged circular connector is used, typically larger than a commercial connector. The channel 106a, 106b provides protection for the power connector to reduce shear forces impacting the power connector. Technologies are currently coming to market that allow remote battery charging without the use of power cables and power connectors. Where possible, such technologies can be employed to reduce potential points of environment intrusion into the enclosure. Referring to FIG. 4, once the enclosure frame and covers are assembled, the bumpers 110 can be added and modules 108 seated within the frame. FIG. 5 illustrates the enclosure 100 from behind, with the rear cover attached to the frame.

Figure 6A:
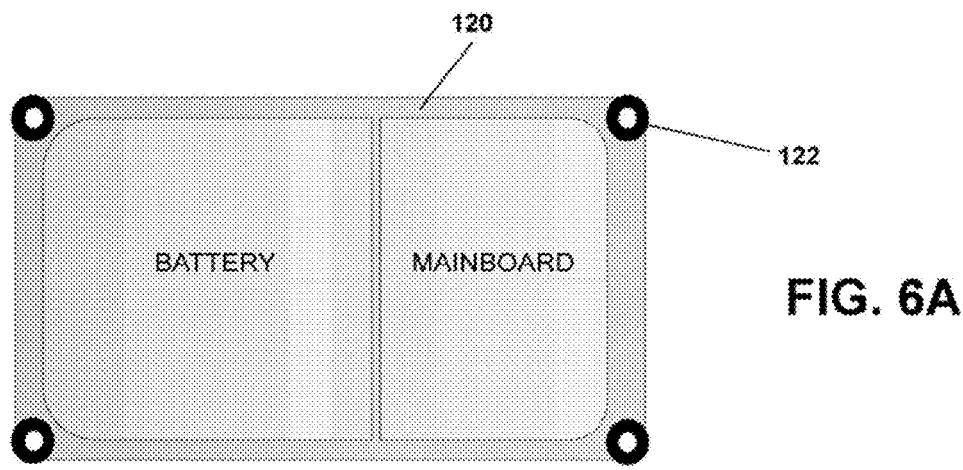
FIG. 6A is a front view of a tray mountable within the enclosures of FIGS. 1-5 for arranging electronic components of the computer device.
Figure 6B:
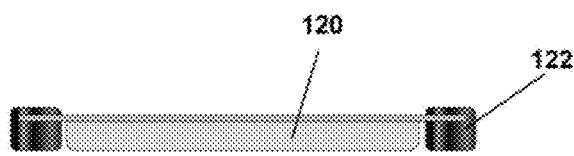
FIG. 6B is an end view of the tray of FIG. 6.

FIGS. 6A and 6B illustrate a tray 120 for cradling components of a computer device within the enclosure. The tray 120 can comprise a plastic, such as a United Laboratories (UL) approved thermoplastic. Such trays can include, for example, commercially available bubble packs and flat packs. As shown, the motherboard and battery are held within separate compartments of the tray 120, and generally "float" within the respective compartment. The tray 120 can be held to the rear cover 104 of the enclosure. For example, the tray can held by four grommets 122, one located to at each corner of the tray 120, the grommets 122 being fixed to the rear cover 104, by adhesion or threaded anchor point, or some other fixation technique. The motherboard is cushioned within a compartment of the tray 120 and resembles a spider on a web, suspended by cabling. Interfaces are cabled off of the motherboard. Antenna leads, power lines, USB, and other signal leads for communicating with devices outside of the environment are threaded through holes in the frame that can be sealed off with silicone and further overlapped by a module to avoid environmental intrusion.

Figure 6C:
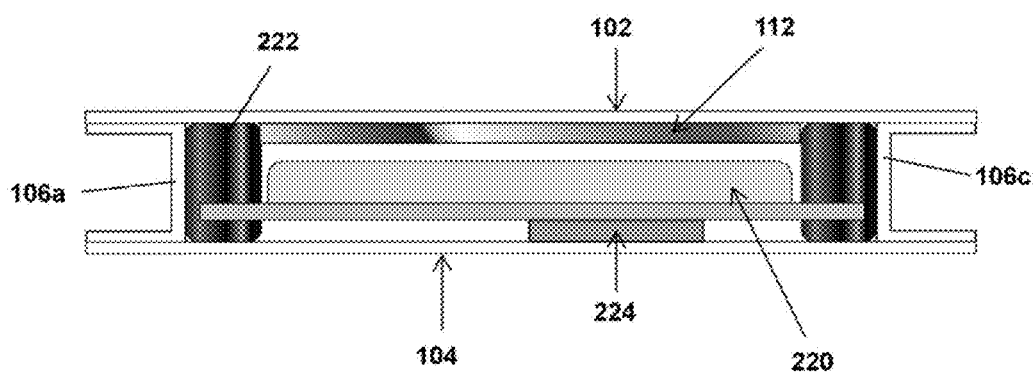
FIG. 6C is a side view of an embodiment of a tray for use with enclosures of the present invention resembling the tray of FIG. 6A and arranged within an enclosure such as shown in FIGS. 1-5.

Referring to FIG. 6C, an embodiment of a tray 220 for use with enclosures of the present invention is shown similar to the tray of FIGS. 6A and 6B, arranged within an enclosure. As can be seen, the grommets 222 are slightly taller than the grommets of FIG. 6B. A heat sink 224 is shown attached between the motherboard and a back cover of the enclosure 104 to draw away heat generated by the electronics. As will be appreciated, the heat sink can be bonded to one or both surfaces. As shown, the tray 220 is spaced slightly from the display 112 and the front cover 102 by the grommets 222.

Figure 7:
FIG. 7 is a rear perspective view of a plurality of sizes with which the enclosures of FIGS. 1-5 can be formed.

Referring to FIG. 7, as described earlier, the thickness of the enclosure can be adjusted by varying the height of the channels. A series of enclosures having different thicknesses is shown. As can be seen, the footprint of the enclosure can be varied as desired as well. The footprint is particularly customizable where lengths of channels are cut as the enclosures are manufactured. Likewise, the front cover and rear cover are manufactured to meet the target footprint of the frame.

Figure 8:
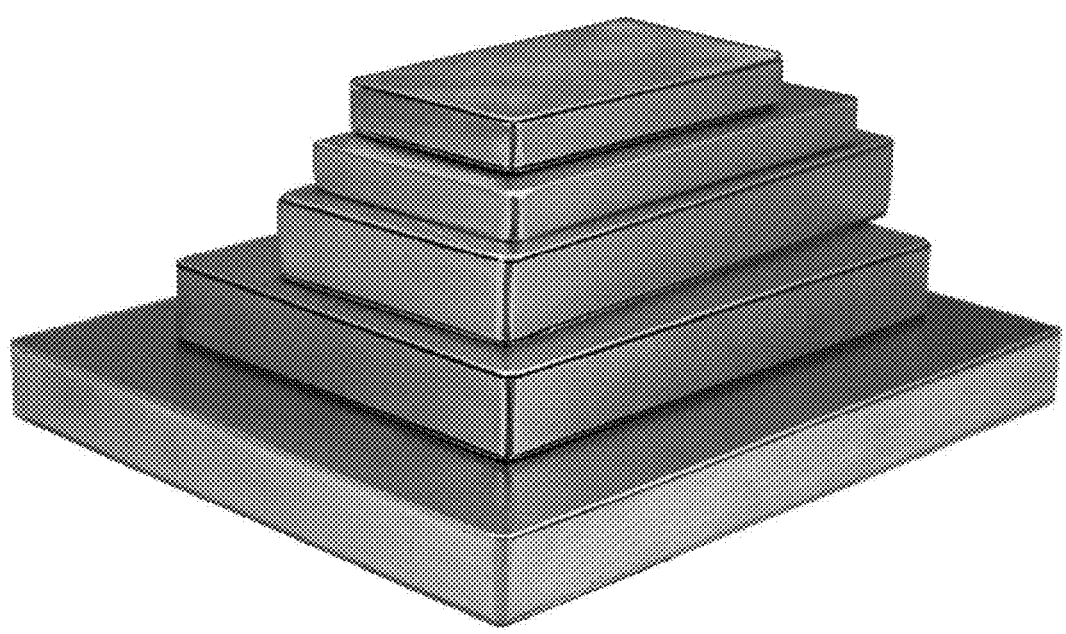
FIG. 8 is a rear perspective view of a plurality of size with which an alternative embodiment of an enclosure in accordance with the present invention can be formed.

While particular benefits have been recited for having channels formed external to the enclosure, for example where there is a desire to eliminate or reduce screws within the enclosures, in other embodiment in accordance with the present invention, this benefit may be less useful than a goal of reducing overall footprint. Referring to FIG. 8, in some embodiments the frames can be reversed so that the channels face inward of the enclosure, creating a sidewall that is flush with the edges of the front and rear covers. Such an embodiment can be used, for example, in making enclosure for cell phones.

Figure 9:
FIG. 9 is a front perspective view of a further embodiment of an enclosure for housing and protecting a computer device in accordance with the present invention.

The modular nature of the sidewall and cover structure can further allow multiple devices and/or objects to be coupled together, either isolated from one another or sharing a common space between covers. Referring to FIG. 9, in an embodiment a second frame can be attached to a first frame, with the first frame acting as a backpack or expansion box. Attaching the expansion box to a first enclosure can reduce the number of separate components, which can be desirable, for example in military applications. Attaching the expansion box to the first enclosure can also be desirable, for example, where one device does not interact with the other device except to monitor the operation of the other device. An expansion box can be useful when multiple devices work together, although the expansion box is not necessarily limited to attaching devices that work together. An expansion box attached to a computer device can provide an enclosure for additional electronics, and can be connected through a hole in a cover separating the two enclosures, for example, or via external connection between modules. An expansion box can also provide an additional channel for attaching the enclosure to a mount of a vehicle or the like, as described previously.

Figure 10:
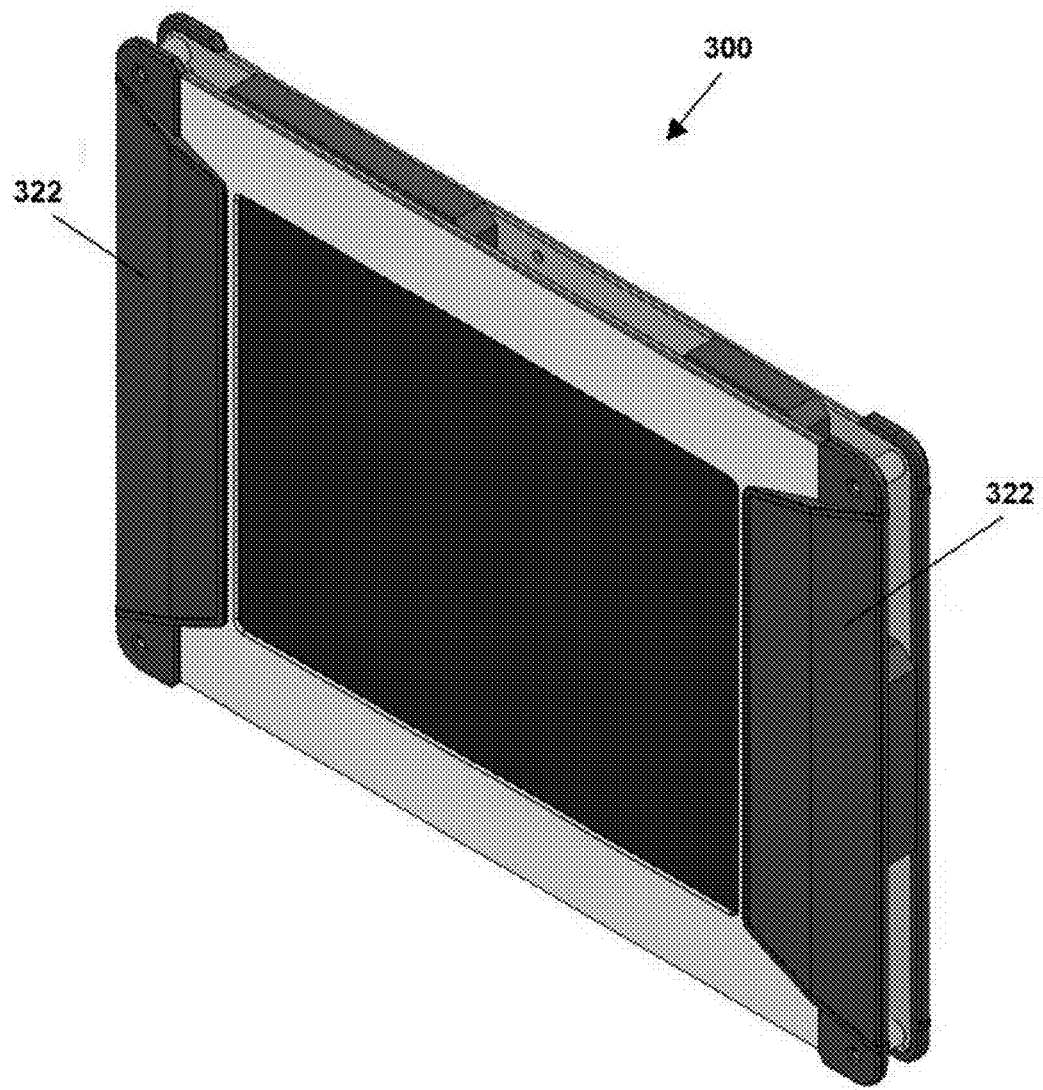
FIG. 10 is a front perspective view of an alternative embodiment of an enclosure for housing and protecting a computer device in accordance with the present invention.
Figure 11:
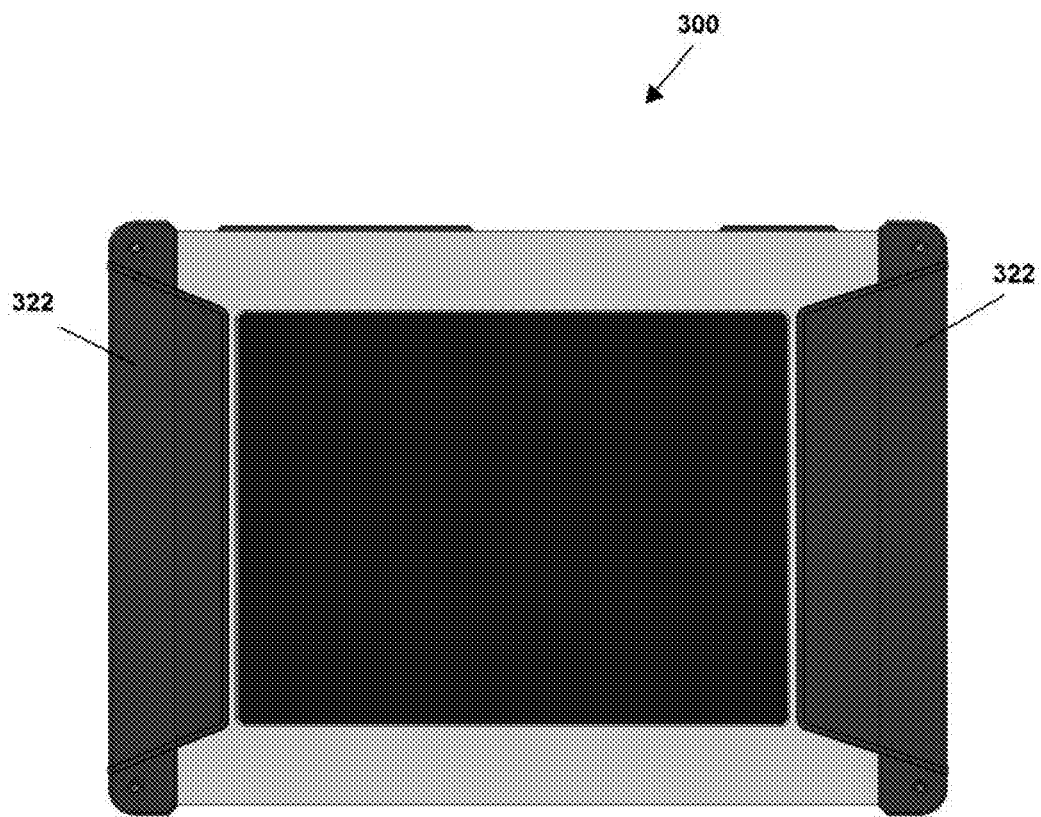
FIG. 11 is a front view of the enclosure of FIG. 10.

FIG. 10 is a front perspective view and FIG. 11 is a front view of an alternative embodiment of an enclosure 300 for housing and protecting a computer device in accordance with the present invention. As can be seen, the embodiment resembles the embodiment of FIGS. 1-5, but comprises hand grips 322 along the sides of the enclosure 300. The hand grips 322 allow a user to grasp the enclosure 300 comfortably with less slippage. The hand grips 322 can be made from a rubberized material, for example, to further resist slippage. Optionally, the hand grips 322 can be textured and can extend to the corners of the enclosure to act as replacements for the bumpers of FIG. 1, absorbing shocks and vibrations to the corners of the enclosure 300, as well as absorbing shocks and vibrations to the sides of the enclosure 300.

Figure 12:
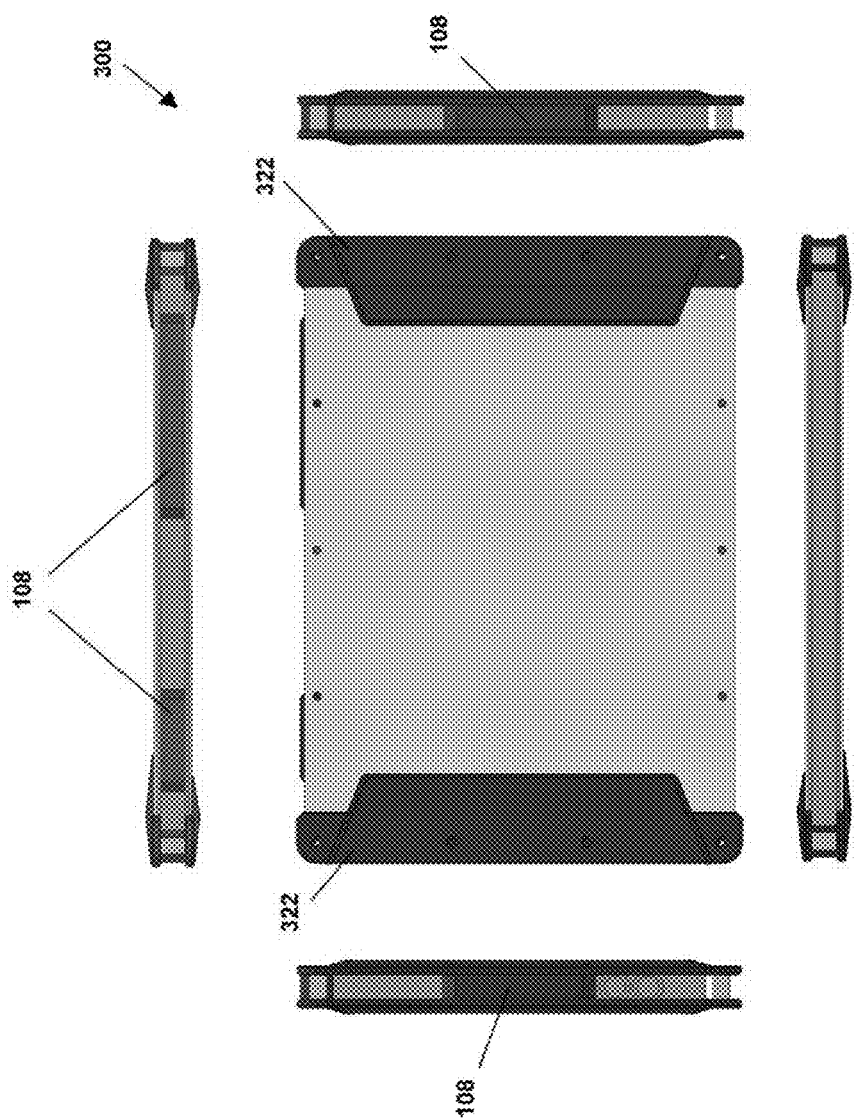
FIG. 12 illustrates rear, side, and end views of the enclosure of FIG. 10.

FIG. 12 illustrates additional views for the enclosure of FIG. 10, including a rear view, side views and end views. As can be seen, the enclosure 300 resembles the enclosure 100 of FIG. 1, including having two modules 108 seated in a channel of the frame along the top end, and modules in each of the sides. As will be appreciated, with all embodiments described herein, any number of enclosures can be used or no enclosures at all. Locations of enclosure can influence where through holes are formed in the channels of the enclosure to deliver wires.

Figure 13:
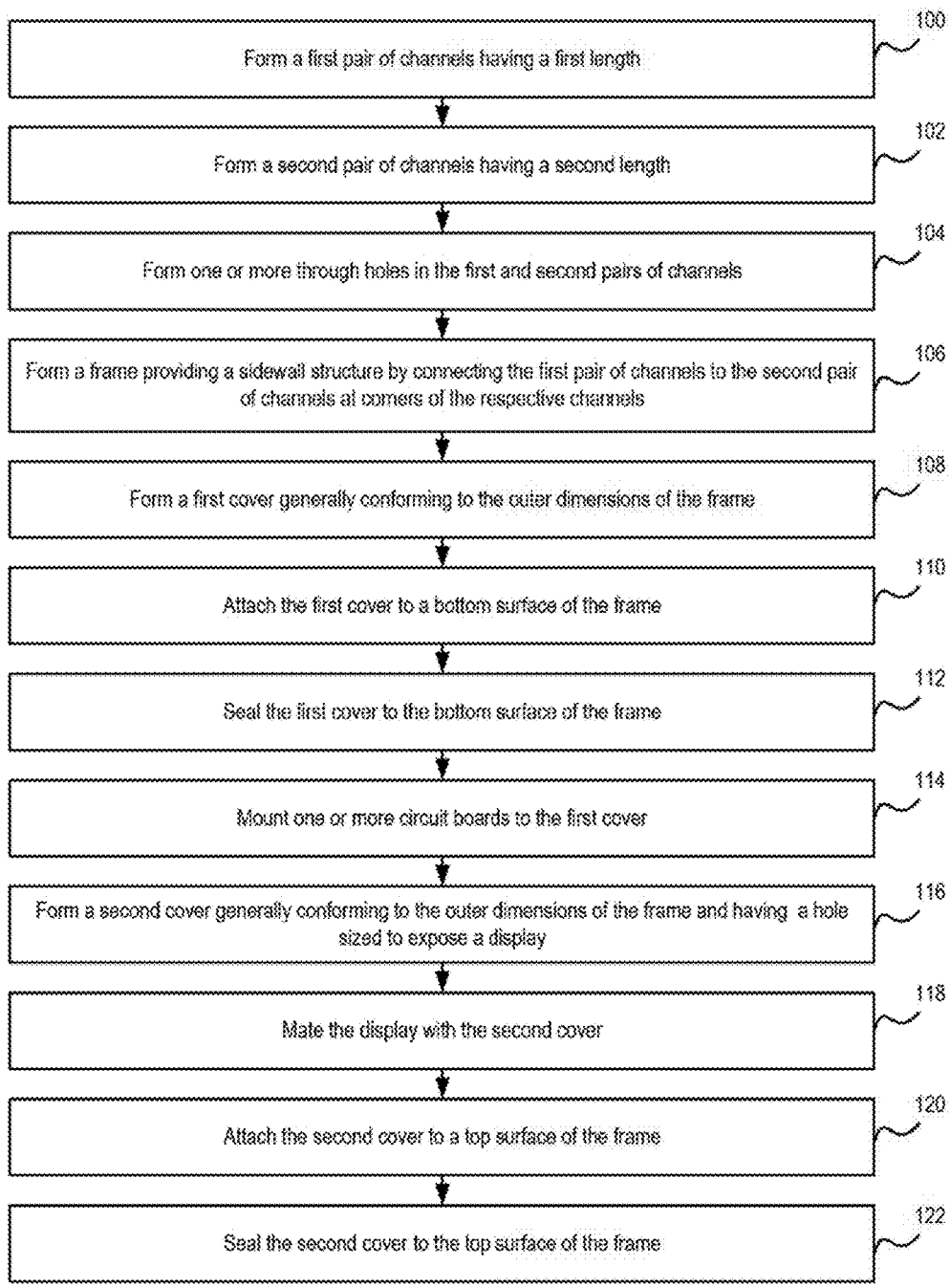
FIG. 13 is a flowchart of a method of manufacturing a computing device having an enclosure adapted to resist ingress of environmental elements.

FIG. 13 is a flowchart for a method of manufacturing a computing device having an enclosure adapted to resist ingress of environmental elements, in accordance with an embodiment. The method includes forming a first pair of channels having a first length (Step 100) and a second pair of channels having a second lengths (Step 102). One or more through holes can be formed in the first and second pairs of channels (Step 104) to pass electrical wires through when the enclosure is formed. A frame is formed providing a sidewall structure by connecting the first pair of channels to the second pair of channels at corners of the respective channels. (Step 106) such that the first pair of channels is parallel to each other and spaced apart from each other and the second pair of channels is parallel to each other and spaced apart from each other and perpendicular to the first pair of channels. The channels can be beveled when formed to allow the corners to abut one another, and a seal can be formed at the corners, for example using a forma seal.

A first cover can be formed generally having a footprint generally conforming to the outer dimensions of the frame (Step 108) and attached to a bottom surface of the frame (Step 110). The edges can then be sealed, for example, to seal the first cover to the bottom surface of the frame (Step 112). One or more circuit boards can then be mounted onto the first cover (Step 114). A second cover can be formed having a footprint generally conforming to the outer dimensions of the frame and having formed therein a hole sized to expose a display to thereby provide a bezel for the display (Step 116). The display can be mated with the second cover so that an outer edge of the display and the second cover form a seal (Step 118) and the second cover can be mated to a top surface of the frame (Step 120). The second cover can then be sealed to the top surface of the frame (Step 122). In addition embodiments, modules can then be mounted within the channels of the sidewall and connected with the one or more circuit boards via one or more electrical harnesses, for example.

In still further embodiments, an expansion box can house an engine box or bread box usable with a discrete display panel. Such an embodiment can be useful, for example, for programming and operating commercial displays such as kiosks in shopping centers, or for providing point of sale (POS) services. The expansion box can house computer hardware for driving the display panel, such as a video card and logic circuitry. In the case of POS services, a module can be included with a card swipe for transacting purchases, for example. The expansion box, and the computer device within the expansion box, can be accessed separately from the display panel.

One will appreciate, upon reflecting on the teachings herein, the myriad different applications with which enclosures in accordance with the present inventions can be used. The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

The invention claimed is:

1. An enclosure for a computing device adapted to resist ingress of environmental elements, comprising: a frame including a first pair of channels having a first length and defining opposite sides of the frame, wherein each channel from the first pair of channels includes a frame sidewall partially defining an inner space of the enclosure, and a front lip and a back lip each extending outward substantially the same distance and substantially parallel to each other so that the frame sidewall is recessed relative to an outer edge of the frame, and a second pair of channels having a second length and defining opposite ends of the frame, wherein each channel from the second pair of channels includes a frame sidewall partially defining an inner space of the enclosure, and a front lip and a back lip each extending outward substantially the same distance and substantially parallel to each other so that the frame sidewall is recessed relative to an outer edge of the frame, wherein a distance between the front lip and the back lip is substantially the same for each of the channels and substantially defines a thickness of the enclosure; a back cover attachable to the frame via a plurality of attachments points formed in the back lip for each channel of the first and second pairs of channels; and a front cover attachable to the frame via a plurality of attachments points formed in corners defined by the front lips of the frame; and one or more modules for housing a component adapted to communicate with a computing device mounted within the enclosure so as to provide functionality to the computing device, wherein a width of the one or more modules is approximately the thickness of the enclosure, and wherein the one or more modules is seatable within a channel from the first and second pairs of channels and against the frame sidewall of the channel outside of the enclosure such that at least a portion of the one or more modules is recessed relative to the outer edge of the frame.

2. The enclosure of claim 1, wherein the one or modules are physically accessible to the computing device through one or more holes formed through the frame.

3. The enclosure of claim 1, wherein the one or modules are accessible to the computing device via a wireless connection established through the frame.

4. The enclosure of claim 1, wherein the one or more modules are sized so as to be seated within a channel of the first and second pairs of channels so that the one or more modules does not extend beyond the outer edge of the frame.

5. The enclosure of claim 1, wherein the one or more modules are configured to house one or more devices operable through the one or modules including one or more of an antenna, a camera, a sensor, a bar code reader, a radio frequency (RF) identification (ID) reader.

6. The enclosure of claim 1, wherein the one or more modules are configured to house one or more devices accessible via a connector extending from the one or more modules, including a card swipe, a universal serial bus (USB) connector, a legacy connector.

7. The enclosure of claim 1, wherein the one or more modules are configured to house one or more devices configured to supplement the computing device without interacting with an environment external to the enclosure.

8. The enclosure of claim 1, where the second cover has a footprint generally conforming to the outer dimensions of the frame and a hole formed therein sized to expose a display to thereby provide a bezel for the display.

9. The enclosure of claim 1, further comprising:
a first hand grip attachable to the frame via the back lip of a channel of the first pair of channels;
a second hand grip attachable to the frame via the back lip of an opposite channel from the channel of the first pair of channels; and
wherein when the one or more modules is seated within the channel from the first pair of channels and against the frame sidewall of the channel, the one or more modules is completely recessed relative to the outer edge of the first hand grip or the second hand grip.

10. A computing device, comprising: an enclosure adapted to resist ingress of environmental elements, the enclosure including a frame, a front cover attached and sealed to the frame and a back cover attached and sealed to the frame; wherein the frame includes a first pair of channels having a first length and defining opposite sides of the frame, wherein each channel from the first pair of channels includes a frame sidewall partially defining an inner space of the enclosure, and a front lip and a back lip each extending outward substantially the same distance and substantially parallel to each other so that the frame sidewall is recessed relative to an outer edge of the frame, and a second pair of channels having a second length and defining opposite ends of the frame, wherein each channel from the second pair of channels includes a frame sidewall partially defining an inner space of the enclosure, and a front lip and a back lip each extending outward substantially the same distance and substantially parallel to each other so that the frame sidewall is recessed relative to an outer edge of the frame, wherein a distance between the front lip and the back lip is substantially the same for each of the channels and substantially defines a thickness of the enclosure; wherein the back cover is attached to the frame via a plurality of attachments points formed in the back lip for each channel of the first and second pairs of channels; and wherein the front cover attached to the frame via a plurality of attachments points formed in corners defined by the front lips of the frame; one or more circuit boards positioned within a tray; wherein the tray is mounted to the back cover via a plurality of grommets such that the tray is arranged between and spaced apart from the front cover and back cover; a display mounted to the front cover, wherein the display is sealed along edge of the display to the front cover to resist ingress; one or more modules for housing a component adapted to communicate with the one or more circuit boards to provide functionality to the computing device, wherein a width of the one or more modules is approximately the thickness of the enclosure, and wherein the one or more modules is seatable within a channel from the first and second pairs of channels and against the frame sidewall of the channel outside of the enclosure such that at least a portion of the one or more modules is recessed relative to the outer edge of the frame.

11. The computing device of claim 10, wherein the one or more modules are sized so as to be seated within a channel of the first and second pairs of channels so that the one or more modules does not extend beyond the outer edge of the frame.

12. The computing device of claim 10, wherein the one or modules are configured to house one or more devices that are
operable through the one or modules including one or more of an antenna, a camera, a sensor, a bar code reader, a radio frequency (RF) identification (ID) reader, or
accessible via a connector extending from the one or more modules, including a card swipe, a universal serial bus (USB) connector, a legacy connector.

13. The computing device of claim 10, wherein the one or modules are configured to house one or more devices configured to supplement the computing device without interacting with an environment external to the enclosure.

14. The computing device of claim 10, further comprising:
a first hand grip attachable to the frame via the back lip of a channel of the first pair of channels;
a second hand grip attachable to the frame via the back lip of an opposite channel from the channel of the first pair of channels; and
wherein when the one or more modules is seated within the channel from the first pair of channels and against the frame sidewall of the channel, the one or more modules is completely recessed relative to the outer edge of the first hand grip or the second hand grip.

15. The computing device of claim 10, wherein the tray is formed from a pliable thermoplastic and the one or more circuit boards is suspended within the tray and permitted to float within the tray as wiring associated with the one or more circuit boards permits.

* * * * *